United States Patent [19]
Ibaraki et al.

[11] Patent Number: 5,793,561
[45] Date of Patent: *Aug. 11, 1998

[54] ROTARY DRUM ASSEMBLY HAVING DYNAMIC-PRESSURE GENERATING MECHANISM BETWEEN ROTARY SHAFT AND BEARING

[75] Inventors: Shoichi Ibaraki, Tokyo; Tatsuzo Ushiro, Saitama-ken; Hiroo Edakubo, Kanagawa-ken; Toshihiko Nakajima, Kanagawa-ken; Takeshi Kawabe, Kanagawa-ken, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 541,443

[22] Filed: Oct. 10, 1995

[30] Foreign Application Priority Data

| Oct. 14, 1994 | [JP] | Japan | 6-249787 |
| Oct. 14, 1994 | [JP] | Japan | 6-249788 |
| Dec. 27, 1994 | [JP] | Japan | 6-338251 |

[51] Int. Cl.[6] ............................ G11B 5/52; F16C 32/06
[52] U.S. Cl. ...................... 360/84; 360/107; 384/292; 384/114
[58] Field of Search ............................ 360/77.12, 84, 360/107, 109, 130.22–130.24; 384/114, 292; 310/67 R

[56] References Cited

U.S. PATENT DOCUMENTS

| 4,635,352 | 1/1987 | Uhen | 29/598 |
| 4,706,144 | 11/1987 | Asada et al. | 360/107 |
| 4,961,122 | 10/1990 | Sakai et al. | 360/107 |
| 5,141,338 | 8/1992 | Asada et al. | 384/114 |
| 5,381,285 | 1/1995 | Dona | 360/84 |
| 5,471,104 | 11/1995 | Toshimitsu et al. | 310/90 |
| 5,471,732 | 12/1995 | Yumiki et al. | 29/596 |
| 5,502,606 | 3/1996 | Mori et al. | 360/107 |
| 5,509,752 | 4/1996 | Kocisek | 360/84 |

FOREIGN PATENT DOCUMENTS

| 60-121509 | 6/1985 | Japan | 360/84 |
| 61-104416 | 5/1986 | Japan | 360/84 |
| 61-94215 | 5/1986 | Japan | 360/84 |
| 4-26910 | 1/1992 | Japan | 360/84 |
| 4-26911 | 1/1992 | Japan | 360/84 |

*Primary Examiner*—Jefferson Evans
*Attorney, Agent, or Firm*—Robin, Blecker & Daley

[57] ABSTRACT

A rotary drum assembly is arranged so that upper and lower drums can rotate about a central shaft with respect to each other via a dynamic-pressure bearing. In the rotary drum assembly, the central shaft is press-fitted into the rotary upper drum, a sleeve which is formed so that the central shaft can be rotatably fitted thereinto is supported by the fixed lower drum, and a dynamic-pressure generating groove is formed in either one of the central shaft and the sleeve, whereby a dynamic-pressure bearing is formed between the central shaft and the sleeve.

20 Claims, 8 Drawing Sheets

PRESS FIT

ROTARY DRUM ASSEMBLY HAVING DYNAMIC-PRESSURE GENERATING MECHANISM BETWEEN ROTARY SHAFT AND BEARING

BACKGROUND OF THE INVENTION

1. Field of the Invention

The present invention relates to a rotary drum assembly, such as a rotary head assembly, for use in a magnetic recording/reproducing apparatus, such as a video tape recorder (VTR).

2. Description of the Related Art

In a helical scan type of magnetic recording and reproducing apparatus, the rotary drum assembly is arranged to cause a recording and reproducing magnetic head to rotate to record an electrical signal on magnetic tape in an oblique direction (conversion from electrical signal to magnetic signal) or to reproduce the recorded magnetic signal (conversion from magnetic signal to electrical signal). In this rotary drum assembly, how accurately the relative speed and position between a magnetic head and the magnetic tape are held and reproduced is of extreme importance, and the rotary drum assembly is required to have performance which can cope with such accuracy.

Figure 1:
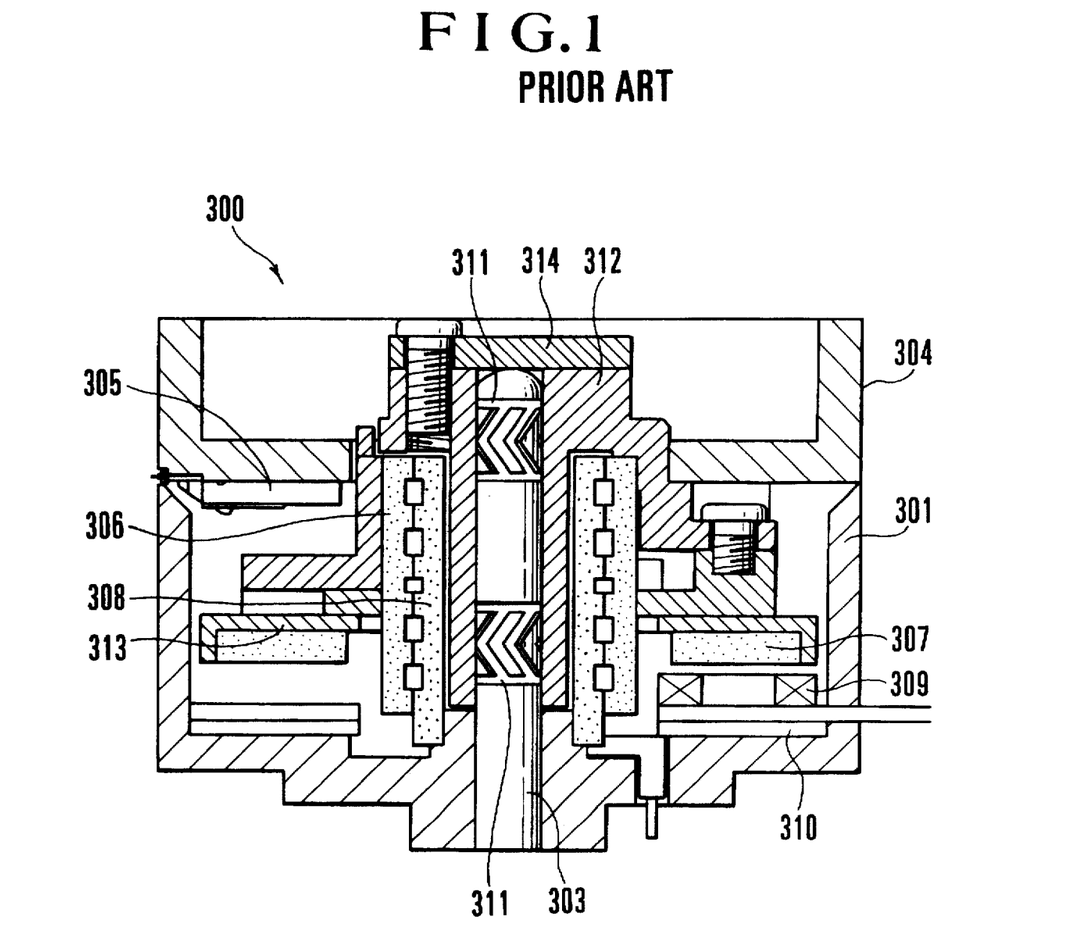
FIG. 1 is a diagrammatic longitudinal sectional view of a conventional rotary drum assembly.

Specifically, the rotary drum assembly is required to exhibit less rotational non-uniformity, minimum vibrations, less noise due to vibrations, or the like. For this reason, a rotary drum which employs a fluid bearing using the generation of a dynamic pressure due to a groove (dynamic-pressure drum) is substituted for a conventional type of rotary drum using a ball bearing (ball-bearing drum). FIG. 1 diagrammatically shows one example of the construction of a dynamic-pressure drum 300 of this conventional type. The constituent elements of the dynamic-pressure drum 300 will be described below.

The dynamic-pressure drum 300 shown in FIG. 1 includes a lower drum 301, a shaft 303 coaxially fixed to the lower drum 301, an upper drum 304, and an upper drum base 312 coaxially fixed to the upper drum 304. The shaft 303 is fitted into the upper drum base 312 with a predetermined clearance formed therebetween. Herringbone grooves 311 are formed to extend around the circumferential face of either one of the shaft 303 and the upper drum base 312 at two or more locations within the clearance, and the herringbone grooves 311 are charged with an operating fluid (not shown). A radial bearing is formed by the herringbone grooves 311 and the operating fluid charged thereinto.

A magnetic head 305 for recording and reproduction is fixed to the upper drum 304, and a transformer (rotor) 306 is fixed to the upper drum 304. A transformer (stator) 308 which is fixed to the lower drum 301 is disposed at a position opposite to the transformer (rotor) 306. A motor coil 309 is fixed to the lower drum 301 together with a yoke 310. A motor magnet 307 is disposed at a position opposite to the motor coil 309 and is fixed to the upper drum 304 via a magnet holder 313.

The motor coil 309, the yoke 310, the motor magnet 307 and the magnet holder 313 constitute a motor unit which serves to convert electrical energy into rotational energy for the dynamic-pressure drum 300. The abutment face of the upper end of the shaft 303 is formed in an approximately hemispherical shape, and a thrust receiving plate 314 made of metal such as SUS is fixed to the upper drum base 312, thereby constituting a pivot bearing which serves as a thrust bearing. A magnetic force working between the motor magnet 307 and the yoke 310 is used as a restricting force which acts in the thrust direction.

When a rotary drum unit is rotated by causing a predetermined current to flow in the motor coil 309, a speed difference occurs between the upper drum base 312 and the shaft 303 and a pressure difference occurs in the operating fluid owing to the herringbone grooves 311, so that the radial position of the shaft 303 is restricted in non-contact relationship to the upper drum base 312. The dynamic-pressure drum having the above-described construction is advantageous in respect of whirling or vibrations which have been unavoidable in the ball-bearing drum because of the looseness or the like of balls disposed between the inner and outer races of the ball-bearing drum.

TABLE 1

| Bearing Type | Whirling (μm) |
| --- | --- |
| Dynamic-Pressure Drum | 0.5 |
| Ball-Bearing Drum | 1.0 |

Table 1 comparatively shows the magnitudes of whirling of a dynamic-pressure drum and a ball-bearing drum (which is identical to the dynamic-pressure drum except for its bearing structure). As can be seen from Table 1, the whirling of the dynamic-pressure drum is less than that of the ball-bearing drum. Table 2 comparatively shows the measurement results of the noise levels of these two drums. As can be seen from Table 2, the dynamic-pressure drum is more advantageous in terms of noise level as well.

| Bearing Type | Noise Level (dB) |
| --- | --- |
| Dynamic-Pressure Drum | 31.7 |
| Ball-Bearing Drum | 37.7 |

However, the above-described conventional type of dynamic-pressure drum 300 has a number of problems. For example, the amount of variation in current consumption due to temperature variations becomes large, depending on the machining accuracy. In addition, when the magnetic head 305 for recording and reproduction is replaced, adjustment of the height of the magnetic head 305 (adjustment of a reference height) must be performed after the assembly of the drum 300.

The conventional type of thrust receiving plate 314 made of metal has the problem that although it is subjected to wear-resistant surface treatment, the thrust bearing part wears with the passage of time and the height of the magnetic head 305 varies because of the construction in which metals make contact with each other.

SUMMARY OF THE INVENTION

It is, therefore, an object of the present invention to provide a rotary drum assembly which is capable of solving the above-described problems, which is easy to assemble and can be readily adjusted even after assembly, and which is capable of guaranteeing its optimum function at all times.

To achieve the above object, in accordance with one aspect of the present invention, there is provided a rotary drum assembly which comprises a first drum having a shaft fixed thereto, a second drum having a radial bearing for providing radial support for the shaft, and a dynamic-pressure generating mechanism having a groove for generating a dynamic pressure, the groove being formed in the radial bearing.

In accordance with another aspect of the present invention, there is provided a rotary assembly which comprises a rotary member, a support member for supporting the rotary member, a shaft provided in either one of the rotary member and the support member, a bearing provided in the other of the rotary member and the support member, and a dynamic-pressure generating mechanism having a groove formed in the bearing, for generating a dynamic pressure, the groove including a first helical portion and a second helical portion which respectively correspond to two opposite-handed helices, and a relief portion for allowing the adjacent ends of the first and second helical portions to be spaced apart by a predetermined distance in an axial direction of the radial bearing.

In accordance with another aspect of the present invention, there is provided a rotary assembly which comprises a rotary member having a shaft fixed thereto, a support member having a radial bearing for supporting the shaft, and a dynamic-pressure generating mechanism provided between the shaft and the radial bearing.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

A rotary drum assembly according to a first embodiment of the present invention will be described below with reference to FIGS. 2 and 3.

Figure 2:
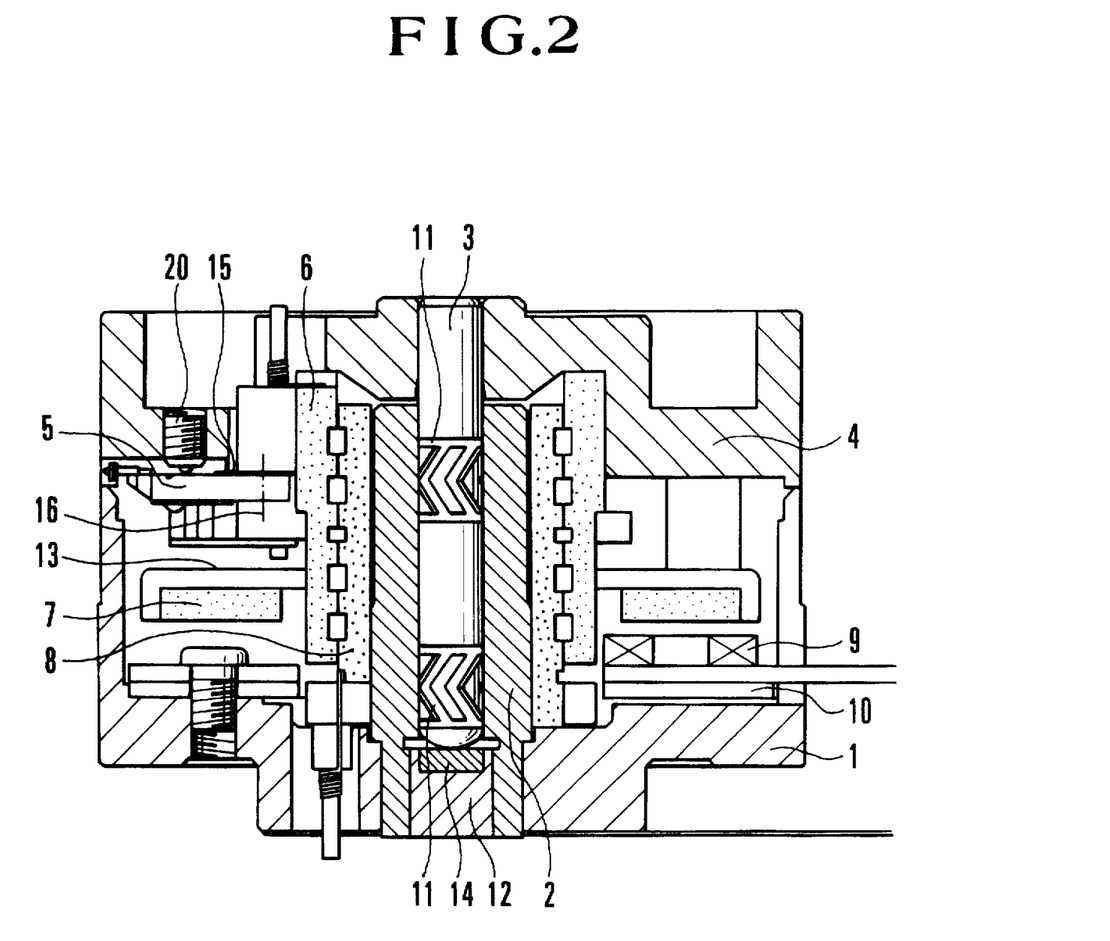
FIG. 2 is a diagrammatic longitudinal sectional view of a rotary drum assembly according to a first embodiment of the present invention.
Figure 3A:
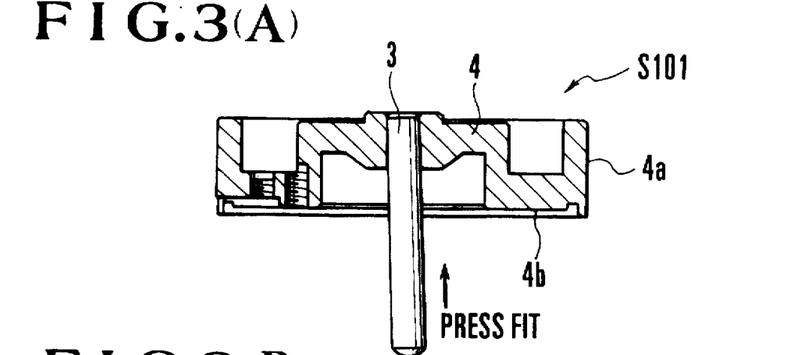
FIGS. 3(A), 3(B) and 3(C) show a flowchart of the machining of an upper drum for the rotary drum assembly according to the first embodiment of the present invention.

FIG. 2 diagrammatically shows a rotary drum assembly having a dynamic-pressure bearing according to the first embodiment. As shown, a sleeve 2 is press-fitted into a lower drum 1, and grooves 11 for generating a dynamic pressure, which are similar to the herringbone grooves 311 used in the related art, are cut in the sleeve 2. (The grooves 311, which are cut in the sleeve 2, are actually hidden behind a central shaft 3 as viewed in FIG. 2, but their shapes and positions are shown on the central shaft 3 for the convenience of explanation.) The central shaft (rotary shaft) 3 is fitted into the sleeve 2 with a predetermined clearance formed therebetween, and the clearance is filled with an operating fluid. An upper drum 4 is coaxially fixed to the central shaft 3.

The upper drum 4 is machined by finish machining according to the present invention which will be described later, so that a height from a head fixing face to the upper end of the central shaft 3, a perpendicularity of the central shaft 3 and a whirl of a tape running face can be secured with high accuracy.

The upper drum 4 is provided with a magnetic head 5, a rotor-side transformer 6, a motor magnet 7 and a magnet holder 13, all of which are arranged similarly to the corresponding elements described previously in connection with the related art. These elements 4, 5, 6, 7 and 13 constitute a rotary drum unit together with the central shaft 3. A stator-side transformer 8 is fixed to the lower drum 1 at a position opposite to the rotor-side transformer 6, and a motor coil 9 and a yoke 10 are also fixed to the lower drum 1 at a position opposite to the motor magnet 7. The rotary drum unit also includes a bending machine screw 20, a shim 15 and a head fixing screw 16.

As in the case of the related art, when the rotary drum unit is rotated by causing a predetermined current to flow in the motor coil 9, a speed difference occurs between the sleeve 2 and the central shaft 3 and a pressure difference occurs in the operating fluid owing to the grooves 11, whereby the radial position of the central shaft 3 is restricted in non-contact relationship to the sleeve 2.

Referring to a thrust bearing, the lower end of the central shaft 3 is rounded to have a predetermined curvature, and a thrust receiving member 14 having wear resistance is employed as a fixed-side abutment face for the central shaft 3. The thrust receiving member 14 is fixed to the sleeve 2 via a holder 12. As in the case of the related art, a magnetic force which works between the motor magnet 7 and the yoke 10 is used as a restricting force which acts in the thrust direction.

The material of the thrust receiving member 14 may be suitably selected from among zirconia, ruby, sapphire and ceramic. The material of the central shaft 3 may be suitably selected from among SUS420J2, SUS440C and SUJ2 (bearing steel). By appropriately combining the materials of the thrust receiving member 14 and the central shaft 3, it is possible to obtain good wear resistance in any case.

Regarding the rounded shape of the lower end of the central shaft 3, for the same pressure force (thrust force), as the value of the radius of the rounded shape becomes larger, the area of contact between the central shaft 3 and the lower end of the thrust receiving member 14 becomes larger, so that loss due to friction during rotation becomes larger. If the value of the radius becomes smaller, the loss due to friction becomes smaller, but the area of contact becomes smaller so that the pressure applied to the portions of contact between the central shaft 3 and the lower end of the thrust receiving member 14 becomes higher and the progress of wear becomes rapid. As a result, the height of the magnetic head 5 of the rotary drum unit will vary. For this reason, the material of the central shaft 3, the material of the thrust receiving member 14 and the rounded shape of the lower end of the central shaft 3 are determined in consideration of thrust force, frictional loss and endurance (the amount of variation of the height). According to the first embodiment, an optimum result can be obtained by selecting, for example, SUS420J2, zirconia and a radius of 3–5 mm.

The relationship between the operating fluid and the clearance between the central shaft 3 and the grooves 11 of the sleeve 2 (hereinafter referred to as the "bearing clearance") is now discussed.

First of all, it is necessary to determine rigidity and loss ($\approx$drum current consumption) which are necessary and sufficient for the dynamic-pressure drum. There are numerous combinations of the bearing clearance and the operating fluid which satisfy conditions for determining the rigidity and loss. However, the bearing clearance, if it is small, is susceptible to variations in the outer diameter of the central shaft 3 and the inner diameter of the sleeve 2. Such a small bearing clearance makes it difficult to attain the desired performance and causes a cost increase because dimensional accuracy control is needed (an increase in the total number of manufacturing steps, a lowering in yield, or the like). In addition, variations in rigidity and loss due to temperature variations become far more remarkable because of the difference in coefficient of thermal expansion between the central shaft 3 made of SUS or SUJ and the sleeve 2 made of brass or an aluminum alloy (in this case, the central shaft 3<the sleeve 2).

On the other hand, if the bearing clearance is large, it is necessary to increase the viscosity of the operating fluid. In general, an operating fluid of higher viscosity shows a larger amount of variation in viscosity due to temperature. Accordingly, in the case of a dynamic-pressure drum using an operating fluid of high viscosity, large variations are caused in rigidity and loss by temperature variations.

It is necessary, therefore, to determine an optimum bearing clearance and the viscosity of the operating fluid both of which allow for the above-described points. For example, according to the first embodiment, it is possible to attain best characteristics, particularly when the bearing clearance=7.5 µm and the viscosity of the operating fluid=10 cp (40° C.).

A method of machining and assembling a specific rotary drum assembly according to the first embodiment will be described below. FIGS. 3(A), 3(B) and 3(C) show a flowchart of the process of assembling and machining the rotary drum assembly according to the first embodiment of the present invention.

In the manufacture of the rotary drum assembly according to the present invention, the rotary drum unit and a fixed drum unit are separately assembled before a final step. Referring first to the process of assembling the rotary drum unit, the central shaft 3 is press-fitted into the upper drum 4 (FIG. 3(A), a shaft press-fitting step S101). A tape running face 4a and a head fixing face 4b of the upper drum 4 respectively have predetermined cutting margins "t" which are provided for the subsequent finish machining. At this point in time, the tape running face 4a and the head fixing face 4b of the upper drum 4 are roughly machined.

Figure 3B:
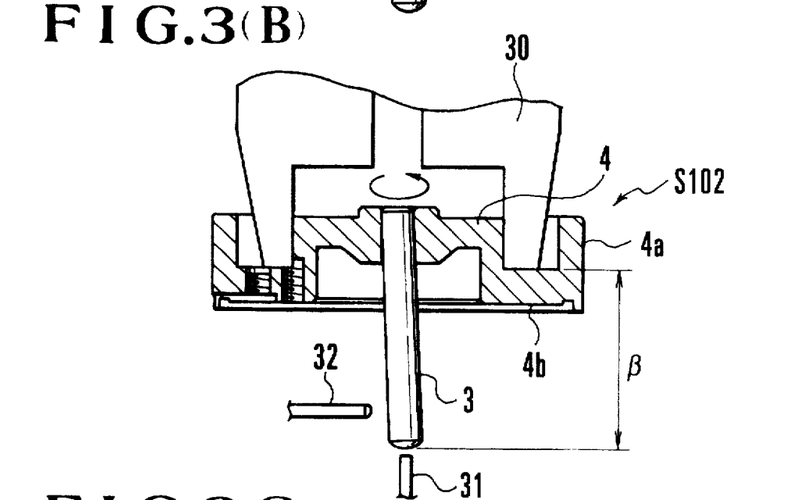

At a measuring step S102 (FIG. 3(B)), the upper drum 4 is fixed to a chuck 30 of a machine tool (suitably, a numerical control lathe) in its machining reference plane. A position β of the lower end of the central shaft 3 is measured by means of a distance sensor 31. Then, while the main spindle of the machine tool is being rotated, the amount of whirling, "α", and the direction of whirling, "θ", of the central shaft 3 are measured through a whirling measuring sensor 32 and a phase sensor (not shown) of the machine tool, respectively. The distance sensor 31 and the whirling measuring sensor 32 may suitably be selected from among, for example, non-contact sensors of the electrostatic capacity or light reflection types so that damage to the central shaft 3 can be prevented. Then, the amount of correction, "d", of machining to be performed in the next upper drum machining step S103 is calculated from the amount of whirling, "α", the position β and the direction of whirling, "θ", which have been measured in the above-described manner.

Figure 3C:
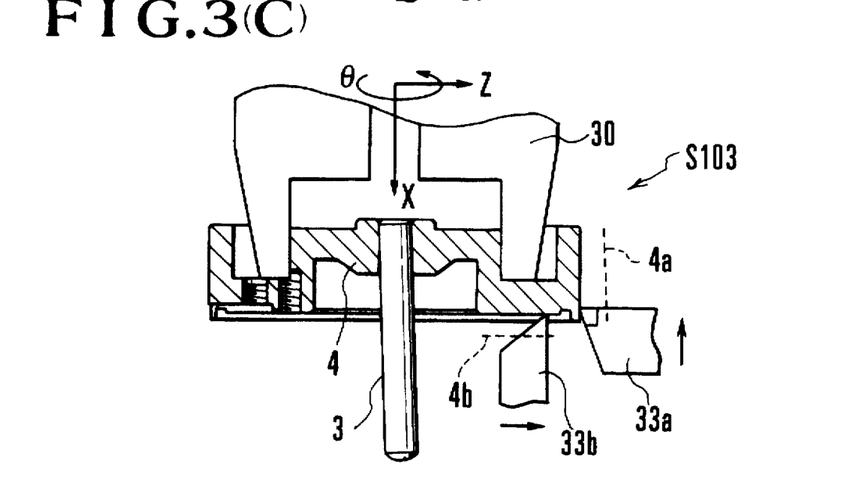

At the upper drum machining step S103 (FIG. 3(C)), the upper drum 4 is cut by the calculated amount of correction, "d", while performing simultaneous three-axis control of the angle of rotation of the main spindle and the respective positions (an axial direction X and a radial direction Z) of cutting tools 33a and 33b so as to cope with the direction of whirling, "θ". By this finish machining, the tape running face 4a and the head fixing face 4b of the upper drum 4 are made axially symmetrical about the central shaft 3.

Figure 4:
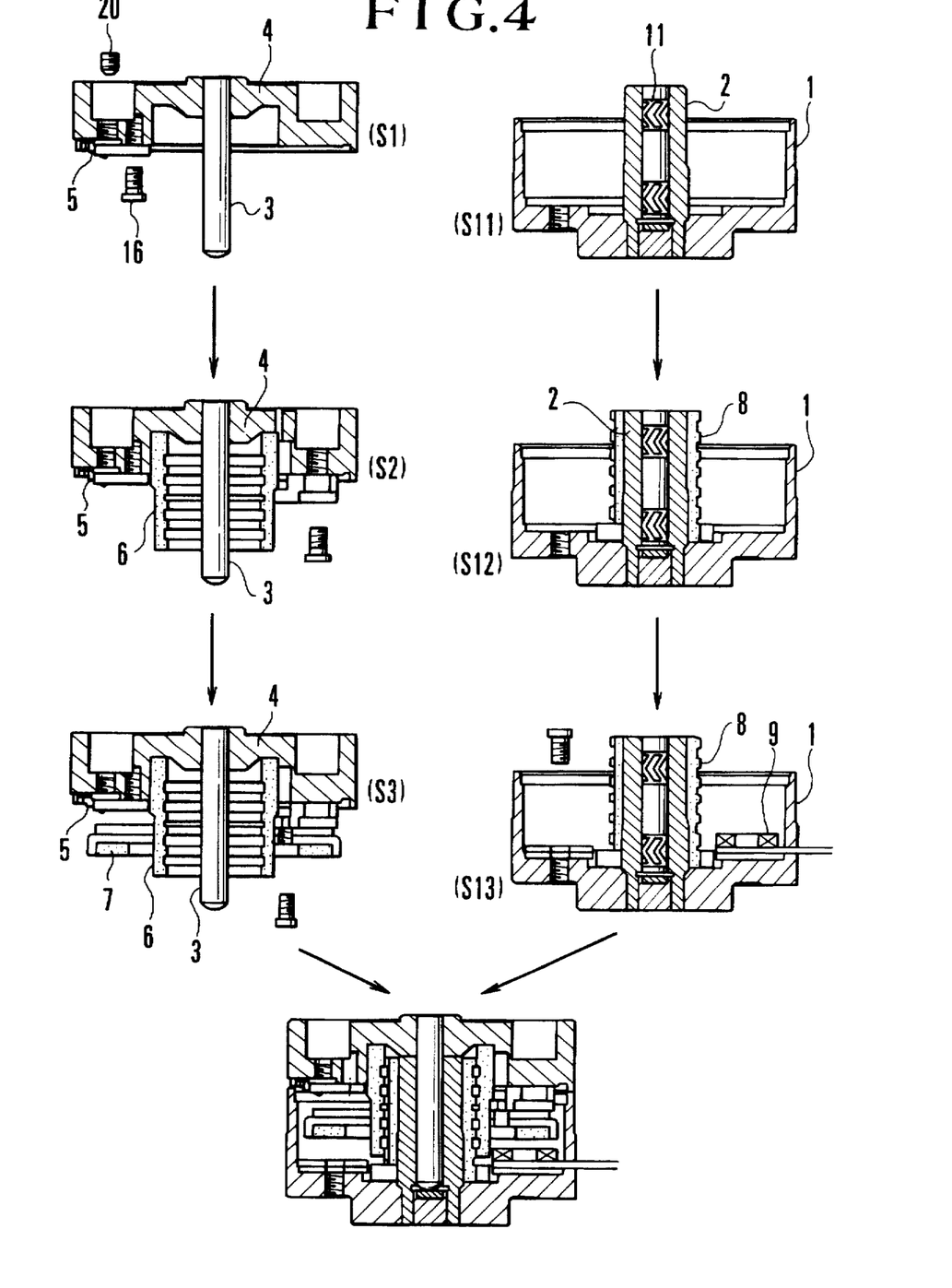
FIG. 4 shows a flowchart of the machining and assembling of the rotary drum assembly according to the first embodiment of the present invention.

After the upper drum 4 has been finish-machined in the above-described manner, the rotary drum unit is assembled in accordance with the process shown in FIG. 4. At a head/bending machine screw fixing step S1, the magnetic head 5 is fixed to the upper drum 4 in a predetermined position by the head fixing screw 16 in such a manner that the shim 15 having the thickness obtained from height data relative to the magnetic head 5 is clamped between the magnetic head 5 and the upper drum 4. The bending machine screw 20 is also fixed to the upper drum 4.

Then, the transformer (rotor) 6 is fixed to the upper drum 4 (a transformer (rotor) fixing step S2) and the motor magnet 7 is fixed to the transformer (rotor) 6, whereby the rotary drum unit is finished (a motor magnet fixing step S3).

The fixed drum unit is prepared in the following manner. The grooves 11 for generating the aforesaid dynamic pressure are formed in the sleeve 2 (a lower drum groove machining step S11), then the transformer (stator) 8 is bonded to the sleeve 2 (a transformer (stator) fixing step S12), and then the motor coil 9 is fixed to the lower drum 1 (a motor coil fixing step S13), whereby the fixed drum unit is finished. After the operating fluid has been charged into the sleeve 2 of the lower drum 1, the upper drum 4 and the lower drum 1 are joined together and the height of the magnetic head 5 is finally finely adjusted by means of the bending machine screw 20. Thus, the rotary drum assembly is finished.

The upper drum 4, particularly the tape running face 4a and the head fixing face 4b, must be machined with an extremely strict machining accuracy. As described above in connection with the first embodiment, the tape running face 4a and the head fixing face 4b have the cutting margins "t" to be finish-machined after the press-fitting of the central shaft 3 into the upper drum 4. Accordingly, since the upper drum 4 need not be machined as a unit component of high accuracy, it is possible to reduce the machining cost of the upper drum 4 itself. In addition, even if the inclination accuracy or positioning accuracy with which the central shaft 3 is press-fitted is rough, such roughness can be fully compensated for by a later finish machining step, so that there is no need to employ a special mechanism such as an ultrasonic vibrator or heater. In the aforesaid process, it is preferable that the central shaft 3 be press-fitted into the upper drum 4 so as to satisfy $\beta \leq \beta 0 - t$, where β represents the distance from the machining reference plane to the lower end of the central shaft 3 and β0 represents a set value of the distance β. Since the machining cost of the upper drum 4 itself can be reduced in this manner, even if the finish machining is performed after the press-fitting of the central shaft 3, the machining cost can be made substantially equal to or less than conventional machining costs.

According to the first embodiment, during the machining of the lower drum 1, the grooves 11 are machined in the process of boring the sleeve 2 (FIG. 4, the lower drum groove machining step S11). Although similar performance can be achieved by forming grooves in the central shaft 3 through plastic deformation or chemical treatment, the resultant machining accuracy will be inferior to that obtainable from the aforesaid boring, or a long machining time will be taken. Regarding the material of the sleeve 2, brass (C3602BD: JIS) is employed in terms of machinability. Although an aluminum alloy similar to the material of the lower drum 1 may also be adopted from the viewpoint of machinability (in terms of not only machinability but also the running stability of magnetic recording and reproducing tape), the difference in coefficient of thermal expansion between the central shaft 3 and the sleeve 2 becomes large and the difference in rigidity and loss between the central shaft 3 and the sleeve 2 increases. In general, aluminum alloy is greater than brass in the possibility that the inner surface of the bored sleeve 2 may be scratched by cut dust. For this reason, in the first embodiment, brass which differs from the material of the lower drum 1 is employed as the material of the sleeve 2.

Although in the above-described embodiment only the tape running face 4a and the head fixing face 4b of the upper drum 4 are finish-machined with reference to the central shaft 3, faces to which fix other portions, such as the transformer (rotor) 6 and the motor magnet 7, may also be finish-machined at the same time, as required. With this machining process, it is possible to provide a higher-performance rotary drum assembly.

Figure 5:
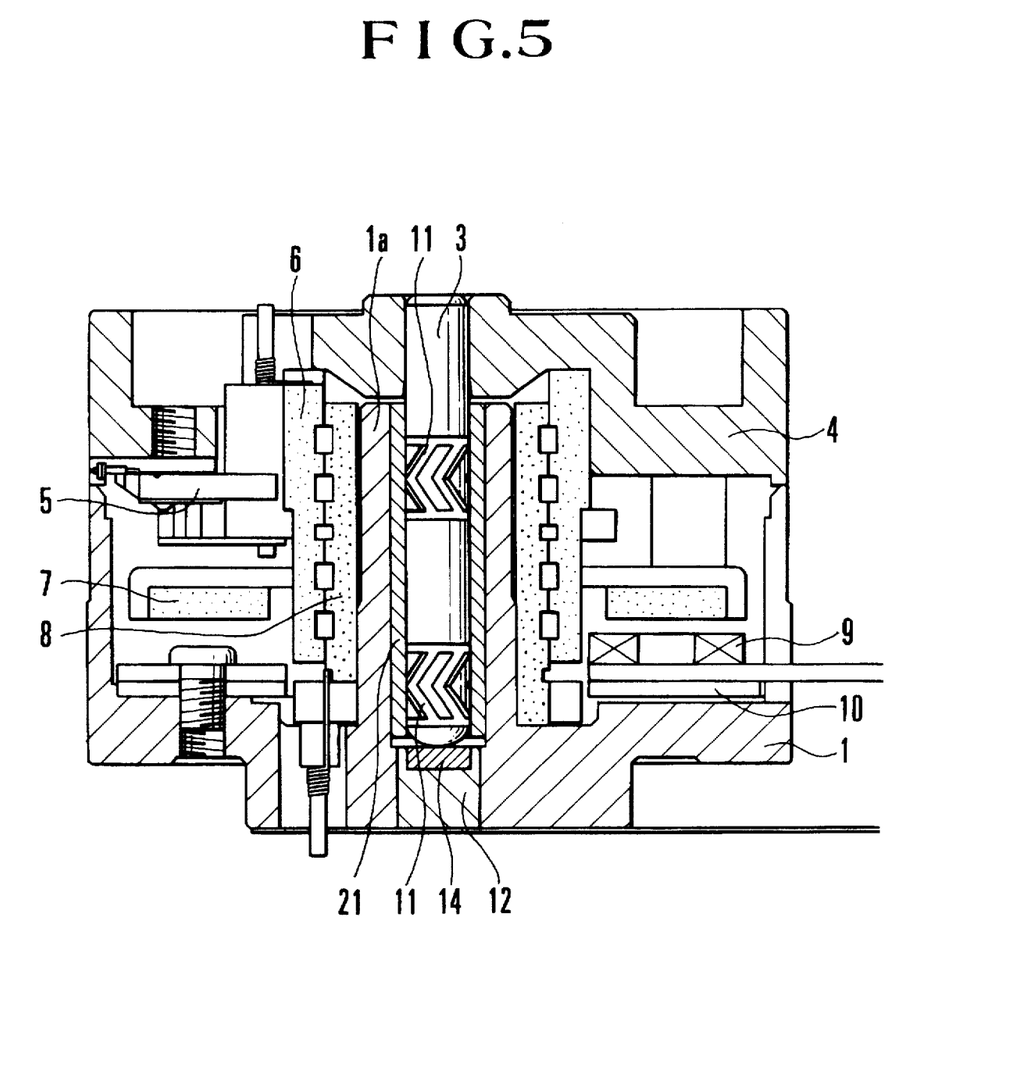
FIG. 5 is a diagrammatic longitudinal sectional view of a rotary drum assembly according to a second embodiment of the present invention.

FIG. 5 diagrammatically shows a second embodiment of the present invention. In FIG. 5, identical reference numerals are used to denote members substantially identical to those of the aforesaid first embodiment.

In the second embodiment, only the inner face of the sleeve is formed of a brass material. Specifically, part of the lower drum 1 is formed into a sleeve-shaped housing portion (aluminum alloy) 1a and a brass tube 21 is inserted in the housing portion 1a. The other constituent elements are basically similar to those of the above-described first embodiment.

According to the second embodiment, since part of the lower drum 1 is formed into the housing portion 1a, it is possible to substantially eliminate the inclination of the sleeve 2 which occurs when the sleeve 2 is press-fitted into the lower drum 1 in the construction shown in FIG. 2, and it is also possible to reduce the amount of correction of the inclination of the boring after the press-fitting of the sleeve 2 (i.e., the size of a cutting margin).

As is apparent from the above description, according to either of the first and second embodiments, a rotary shaft is press-fitted into an upper drum and a sleeve is formed in a lower drum, and a dynamic-pressure generating groove is formed in either of the portions of engagement between the rotary shaft and the sleeve. Accordingly, it is possible to independently machine and assemble the upper rotary drum and the lower fixed drum, whereby it is possible to markedly improve the efficiency of assembly. In addition, since the height of a magnetic head can be adjusted on the rotary side in advance, the magnetic head can be replaced merely by replacing a rotary drum unit, so that the replacement of the magnetic head can be facilitated.

In addition, in the thrust bearing part of the rotary drum assembly, wear-resistant members are employed as the rotary shaft having a hemispherical end portion and a portion which abuts on the hemispherical end portion. Accordingly, their wear resistances are improved and variations in the height of the magnetic head can be suppressed. Even if a variation due to wear occurs in the height of the magnetic head, the rotary shaft wears, so that the rotary drum unit alone may be replaced similarly to the replacement of the magnetic head. In the conventional example, since the magnetic head and the rotary shaft are respectively located on the rotary side and the fixed side, it has been necessary to replace the entire rotary drum assembly.

In addition, since a material which is suited to boring or groove machining is used for the sleeve in the rotary drum assembly, more accurate machining is possible. In the thrust bearing part of the rotary drum assembly, SUS420J2, SUS440C or SUJ2 is used as the material of the rotary shaft, and zirconia, ruby or sapphire is used on a thrust receiving side. Accordingly, it is possible to minimize the wear of the end face of the rotary shaft which abuts on the thrust receiving side.

Since an aluminum alloy and brass are respectively employed as the materials of the lower drum and the sleeve of the rotary drum assembly, the machinability of the lower drum and the sleeve can be made compatible with the running stability of magnetic recording tape.

According to the above-described assembling and machining method, it is possible to greatly improve the accuracy of drum units without involving any cost increase compared to the conventional example. It is also possible to realize the recording and reproduction of accurate and stable signals on and from magnetic tape, whereby recording and reproducing functions can be markedly improved.

A method of machining the herringbone grooves 11 which are formed in each of the sleeves 2 and 21 will be described below with reference to FIGS. 6 and 7(A) to 7(C).

Figure 6:
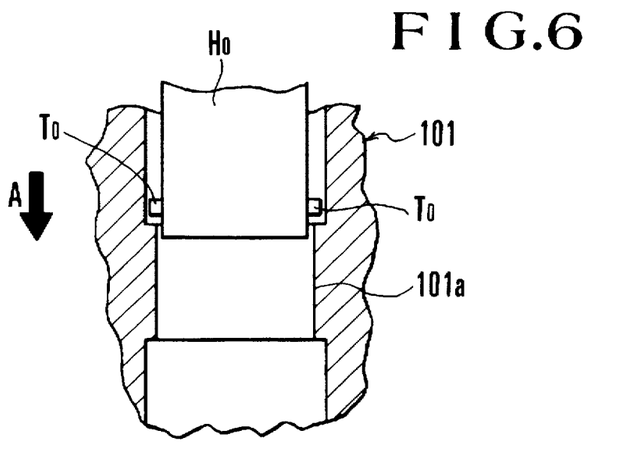
FIG. 6 is a schematic cross-sectional view showing in part a sleeve and cutting tools which are machining a herringbone groove.
Figure 7A:
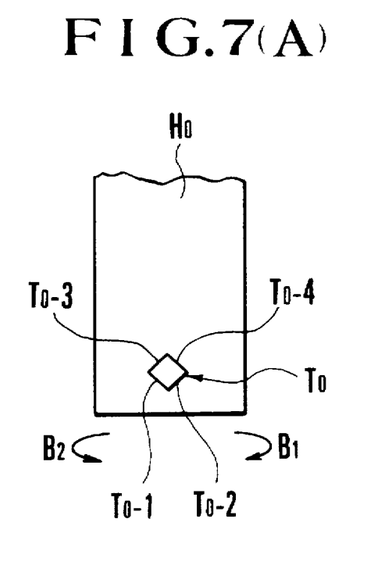
FIGS. 7(A), 7(B) and 7(C) are views aiding in explaining the feeding of a cutting tool which is machining a herringbone groove.
Figure 7B:
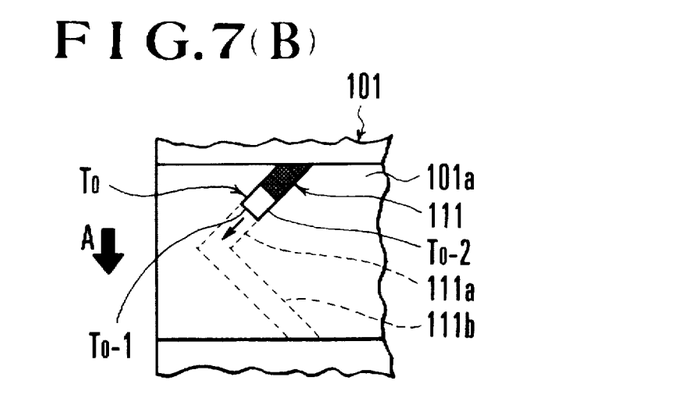
Figure 7C:
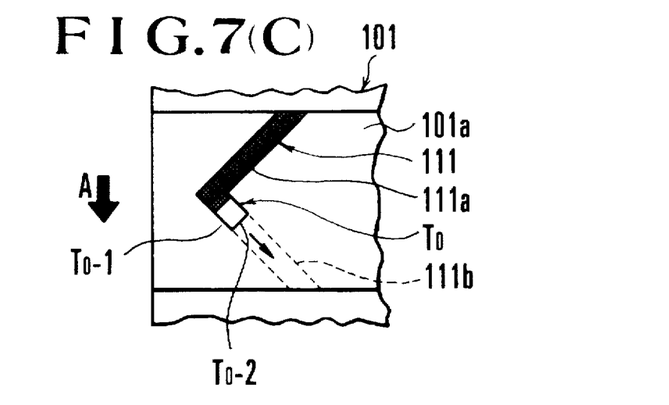

As shown in FIG. 6, a sleeve 101 is prepared which has a small-diameter portion 101a which is, for example, 2 μm smaller than the inner diameter of the sleeve 101 in diameter. The small-diameter portion 101a of the sleeve 101 is cut by causing a holder $H_O$ which holds a pair of cutting tools $T_O$ to alternately rotate in the clockwise direction (indicated by an arrow $B_1$) and in the counterclockwise direction (indicated by an arrow $B_2$), as shown in FIGS. 7(A) to 7(C), while feeding the holder $H_O$ in the axial direction (indicated by an arrow A) of the sleeve 101. Thus, a herringbone groove 111 is formed.

Each of the cutting tools $T_O$ is a quadrangular prism-shaped member having first to fourth cutting edges $T_O-1$ to $T_O-4$ each of which is perpendicular to the adjacent ones. When the holder $H_O$ rotates counterclockwise while moving in the direction of the arrow A, the first cutting edge $T_O-1$ cuts a first helical portion 111a of the herringbone groove 111, as shown in FIG. 7(B). When the holder $H_O$ rotates clockwise, the second cutting edge $T_O-2$ cuts a second helical portion 111b of the herringbone groove 111, as shown in FIG. 7(C). When the holder $H_O$ rotates counterclockwise while being fed axially in the opposite direction, the third cutting edge $T_O-3$ cuts the second helical portion 111b of the herringbone groove 111. When the holder $H_O$ rotates clockwise, the fourth cutting edge $T_O-4$ cuts the first helical portion 111a of the herringbone groove 111.

If the herringbone groove 111 is machined by the above-described boring process, a fast machining speed can be achieved and the machining accuracy can be easily improved. However, when the direction of rotation of the holder $H_0$ is changed, a backlash peculiar to general cutting machines occurs and the holder $H_0$ is fed in the axial direction with the rotation stopped. As a result, excessive forces may be applied to the cutting tools. $T_0$, thereby breaking the cutting tools $T_0$.

A herringbone groove which does not at all cause the problem of breaking such cutting tools and a method of machining such a herringbone groove will be described below.

Figure 8:
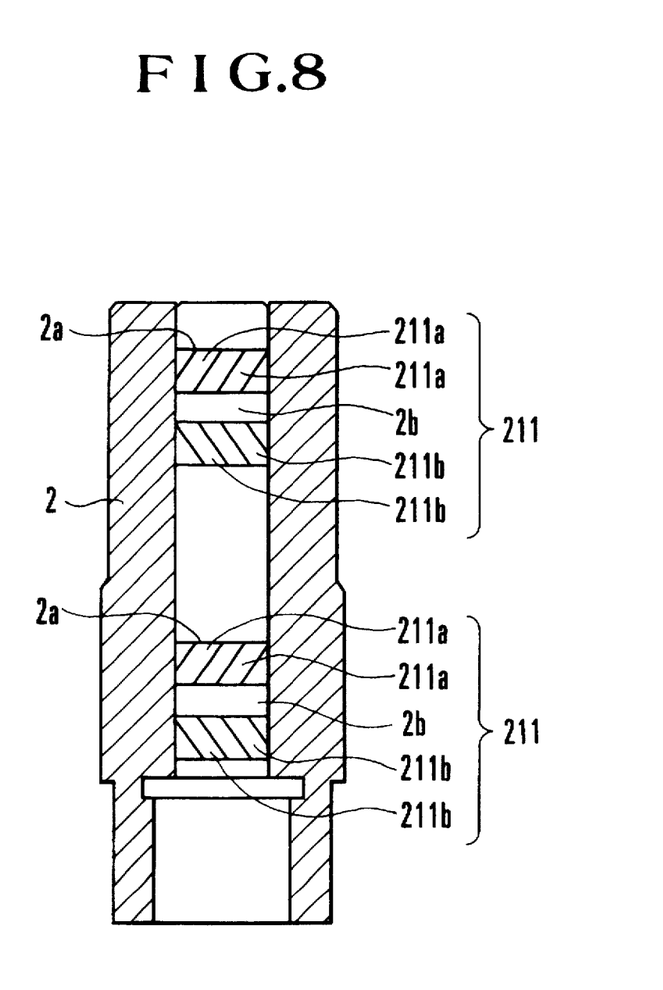
FIG. 8 is a schematic cross-sectional view showing a sleeve in which herringbone grooves are formed.

As shown in FIG. 8, each herringbone groove 211 of the sleeve 2 is arranged to suck the gas between the sleeve 2 and the rotary shaft 3 from both ends of the herringbone groove 211 toward the central portion thereof with the rotation of the rotary shaft 3 (refer to FIG. 2). The rotary shaft 3 is supported in non-contact relationship to the sleeve 2 by the dynamic pressure of the gas sucked in this manner.

Figure 9A:
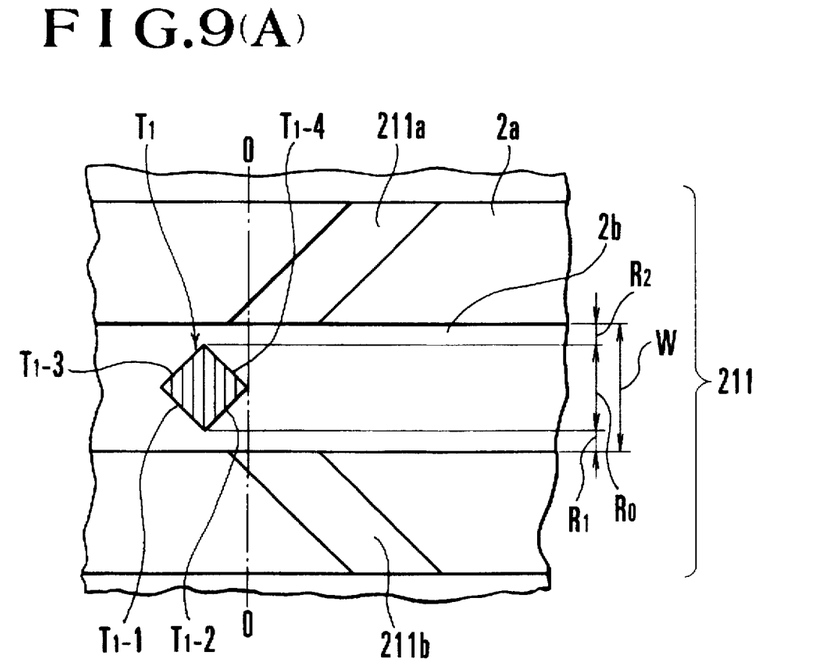
FIGS. 9(A) and 9(B) show part of the inner face of the sleeve shown in FIG. 8 together with a cutting tool, FIG. 9(A) being an explanatory view showing the relationship between the herringbone groove being machined and the cutting edges of a cutting tool, and FIG. 9(B) being a schematic cross-sectional view taken along line O—O of FIG. 9(A).
Figure 9B:
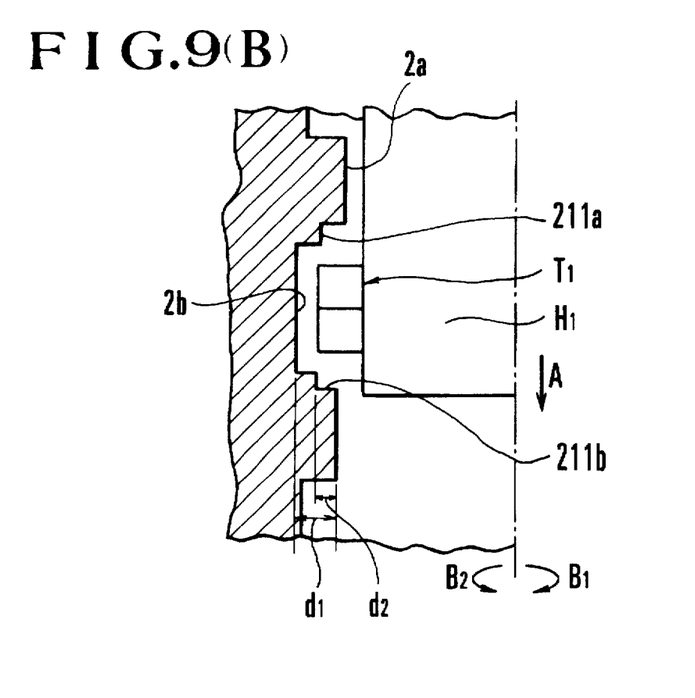

The herringbone grooves 211 of the sleeve 2 are machined in the following manner. Small-diameter portions 2a each of which is, for example, 2 μm smaller than the inner diameter of the sleeve 2 in diameter are formed on the inner face of the sleeve 2, and ring-shaped relief grooves 2b are respectively formed in predetermined portions of the small-diameter portions 2a. Each of the small-diameter portions 2a of the sleeve 2 is cut by causing a holder $H_1$ which holds a cutting tool $T_1$ to alternately rotate in the clockwise direction (indicated by the arrow $B_1$) and in the counterclockwise direction (indicated by the arrow $B_2$), as shown in FIGS. 9(A) and 9(B), while feeding the holder $H_1$ in the axial direction (indicated by the arrow A) of the sleeve 2 in a manner similar to that used in the conventional example. The herringbone grooves 211 are formed by performing the above-described boring process.

The cutting tool $T_1$ is a quadrangular prism-shaped member having first to fourth cutting edges $T_1-1$ to $T_1-4$ each of which is perpendicular to the adjacent ones. When the holder $H_1$ rotates counterclockwise while moving in the direction of the arrow A, the first cutting edge $T_1-1$ cuts a first helical portion 211a of the herringbone groove 211. When the holder $H_1$ rotates clockwise, the second cutting edge $T_1-2$ cuts a second helical portion 211b of the herringbone groove 211. When the holder $H_1$ rotates counterclockwise while being fed axially in the opposite direction, the third cutting edge $T_1-3$ cuts the second helical portion 211b of the herringbone groove 211. When the holder $H_1$ rotates clockwise, the fourth cutting edge $T_1-4$ cuts the first helical portion 211a of the herringbone groove 211.

Each of the relief grooves 2b of the sleeve 2 is disposed so that the cutting tool $T_1$ can be loosely fitted into the relief groove 2b when the direction of rotation of the holder $H_1$ is reversed during the above-described groove machining process. The relief groove 2b serves to prevent excessive forces from being applied to the cutting edges $T_1-1$ to $T_1-4$ of the cutting tool $T_1$ when the holder $H_1$ is merely fed in the axial direction without rotating, owing to the occurrence of a backlash.

Accordingly, in the machining of the herringbone groove 211, since the cutting tool $T_1$ is prevented from being broken or damaged when the direction of rotation of the holder $H_1$ is changed, it is not necessary to use a cutting tool of special high-strength alloy or to decrease the speed of groove machining. It is, therefore, possible to greatly reduce machining cost and greatly improve productivity.

The machining of the herringbone groove 211 is normally effected by gradually cutting the sleeve to the required depth while reciprocating the cutting tool $T_1$ in the axial direction of the sleeve. Accordingly, a width W of the relief groove 2b needs to be equal to or greater than the value obtained by adding together a diameter $R_0$ of the circumscribed circuit of the cutting tool $T_1$, the amount of axial feed, $R_1$, required when a backlash occurs with the cutting tool $T_1$ being axially fed in the direction of the arrow A, and the amount of axial, $R_2$, required when a backlash occurs with the cutting tool $T_1$ being axially fed in the direction opposite to the arrow A.

A depth $d_1$ of the relief groove 2b needs to be made greater than a depth $d_2$ of the herringbone groove 211 so that the cutting edge of the cutting tool $T_1$ can be prevented from coming into contact with the bottom of the relief groove 2b when a backlash occurs. However, if the depth $d_1$ is made excessively large, the bearing characteristics of the dynamic-pressure gas bearing will be impaired. It is desirable, therefore, that the depth $d_1$ be selected to be a maximum of approximately twice the depth of the herringbone groove 211.

According to the above-described herringbone groove and machining method therefor, the herringbone groove can be bored in a sleeve member without the need to employ an expensive cutting tool or reduce the machining speed to a remarkable extent. Accordingly, it is possible to realize a high-performance fluid bearing at a low component cost.

By using such a fluid bearing, it is possible to achieve a low-cost and high-performance magnetic recording and reproducing apparatus and the like.

What is claimed is:

1. A rotary drum assembly comprising:
    (a) a first drum having a shaft fixed thereto;
    (b) a second drum having a radial bearing for providing radial support for said shaft, said second drum being fixedly disposed in said assembly; and
    (c) a dynamic-pressure generating mechanism having a groove for generating a dynamic pressure, said groove being formed in said radial bearing;
    wherein said groove formed in said radial bearing includes a first helical portion and a second helical portion which respectively correspond to two opposite-handed helices, and a relief portion for allowing the adjacent ends of said first and second helical portions to be spaced apart by a predetermined distance in an axial direction of said radial bearing.

2. A rotary drum assembly according to claim 1, further comprising a thrust bearing, an end of said shaft being brought into abutment with said thrust bearing and having a hemispherical shape.

3. A rotary drum assembly according to claim 2, wherein said thrust bearing includes a portion for abutment with said one end of said shaft, which portion is formed of a non-metallic wear-resistant material.

4. A rotary drum assembly according to claim 3, wherein said non-metallic wear-resistant material is selected from among zirconia, ruby and sapphire.

5. A rotary drum assembly according to claim 4, wherein said shaft is formed of a material selected from among SUS420J2, SUS440C and SUJ2.

6. A rotary drum assembly according to claim 1, wherein said radial bearing is formed of a material different from that of said second drum.

7. A rotary drum assembly according to claim 6, wherein said second drum is formed of an aluminum alloy and said radial bearing is formed of brass.

8. A rotary drum assembly according to claim 1, wherein said relief portion has a depth of approximately twice the depth of each of said first and second helical portions.

9. A rotary drum assembly according to claim 1, wherein said second drum has a sleeve in which said groove is formed.

10. A rotary drum assembly according to claim 9, wherein said sleeve is formed of a material softer than the material of said second drum.

11. A rotary drum assembly comprising:
(a) a rotary member;
(b) a support member for supporting said rotary member;
(c) a shaft provided in either one of said rotary member and said support member;
(d) a bearing provided in the other of said rotary member and said support member; and
(e) a dynamic-pressure generating mechanism having a groove formed in said bearing, for generating a dynamic pressure, said groove including a first helical portion and a second helical portion which respectively correspond to two opposite-handed helices, and a relief portion for allowing the adjacent ends of said first and second helical portions to be spaced apart by a predetermined distance in an axial direction of said radial bearing.

12. A rotary assembly according to claim 11, wherein said relief portion has a depth of approximately twice the depth of each of said first and second helical portions.

13. A rotary drum assembly comprising:
(a) a rotary member having a shaft fixed thereto;
(b) a support member having a radial bearing for supporting said shaft; and
(c) a dynamic-pressure generating mechanism provided between said shaft and said radial bearing and formed on said support member;

wherein said dynamic-pressure generating mechanism includes a groove having a first helical portion and a second helical portion which respectively correspond to two opposite-handed helices, and a relief portion for allowing the adjacent ends of said first and second helical portions to be spaced apart by a predetermined distance in an axial direction of said radial bearing.

14. A rotary drum assembly according to claim 13, further comprising a thrust bearing, an end of said shaft being brought into abutment with said thrust bearing and having a hemispherical shape.

15. A rotary drum assembly according to claim 14, wherein said thrust bearing includes a portion for abutment with said one end of said shaft, which portion is formed of a non-metallic wear-resistant material.

16. A rotary drum assembly according to claim 13, wherein said radial bearing is formed of a material different from that of said second support member.

17. A rotary drum assembly according to claim 16, wherein said support member is formed of an aluminum alloy and said radial bearing is formed of brass.

18. A rotary drum assembly according to claim 13, wherein said relief portion has a depth of approximately twice the depth of each of said first and second helical portions.

19. A rotary drum assembly according to claim 13, wherein said support member has a sleeve in which said groove is formed.

20. A rotary drum assembly according to claim 19, wherein said sleeve is formed of a material softer than the material of said support member.

* * * * *